(12) United States Patent
Zhan et al.

(10) Patent No.: US 7,275,365 B2
(45) Date of Patent: Oct. 2, 2007

(54) METHOD FOR CONTROLLING TEMPERATURE IN A DIESEL PARTICULATE FILTER DURING REGENERATION

(75) Inventors: Rijing Zhan, San Antonio, TX (US); Yiqun Huang, San Antonio, TX (US); Magdi K. Khair, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 26 days.

(21) Appl. No.: 11/253,018

(22) Filed: Oct. 18, 2005

(65) Prior Publication Data

US 2006/0096280 A1  May 11, 2006

Related U.S. Application Data

(60) Provisional application No. 60/625,324, filed on Nov. 5, 2004.

(51) Int. Cl.
*F01N 3/00* (2006.01)

(52) U.S. Cl. .............................. 60/295; 60/274; 60/276; 60/297; 60/311

(58) Field of Classification Search ................. 60/274, 60/276, 285, 295, 297, 303, 311
See application file for complete search history.

(56) References Cited

U.S. PATENT DOCUMENTS

| | | | | |
|---|---|---|---|---|
| 6,851,256 | B2 * | 2/2005 | Chamoto et al. | 60/280 |
| 6,851,258 | B2 * | 2/2005 | Kawashima et al. | 60/311 |
| 6,910,329 | B2 * | 6/2005 | Bunting et al. | 60/295 |
| 6,969,413 | B2 * | 11/2005 | Yahata et al. | 55/282.3 |
| 6,983,591 | B2 * | 1/2006 | Kondo et al. | 60/295 |
| 7,146,804 | B2 * | 12/2006 | Yahata et al. | 60/295 |
| 2004/0194450 | A1 * | 10/2004 | Tanaka et al. | 60/285 |

* cited by examiner

*Primary Examiner*—Thomas Denion
*Assistant Examiner*—Diem Tran
(74) *Attorney, Agent, or Firm*—Gunn & Lee, P.C.

(57) ABSTRACT

Uncontrolled regeneration in a Diesel particulate filter is prevented by controlling the concentration and mass flowrate of oxygen passing through the Diesel particulate filter during regeneration.

13 Claims, 3 Drawing Sheets

METHOD FOR CONTROLLING TEMPERATURE IN A DIESEL PARTICULATE FILTER DURING REGENERATION

BACKGROUND OF THE INVENTION

This is a non-provisional application claiming priority to U.S. Provisional Application Ser. No. 60/625,324 filed Nov. 5, 2004.

TECHNICAL FIELD

This invention relates generally to a method for regenerating Diesel particulate filters and more particularly to such a method whereby uncontrolled regeneration of the Diesel particulate filter is prevented.

BACKGROUND ART

Increasingly restrictive emissions regulations, particularly for Diesel engines, permit very little particulate matter (PM) to be emitted from an engine. Particulate matter is the term used for the solids emitted by an engine. PM comprises mostly carbon soot and hydrocarbons. Soot is more than just black smoke; it is also made up of a large number of ultra-fine particles that are invisible to the naked eye.

Diesel particulate filters, or DPFs, are used to control emissions of PM from Diesel engine exhaust. Diesel particulate filters are also known as soot filters or Diesel filters. Typically, a Diesel particulate filter having a substrate without any coated catalyst deposited on the substrate is simply called a DPF. If a catalyst is coated on the Diesel particulate filter substrate surface, the filter is properly referred to as a catalyzed DPF, or a CDPF. There are several DPF units that are commercially available, and fall into such categories as continuously regenerated traps (CRTs) or catalyzed continuously regenerated traps (CCRTs). However, the term "DPF" as used herein represents all Diesel particulate matter (PM) filters and regenerable soot control devices.

Diesel particulate filters operate in repeating alternate PM (or soot) loading and regeneration cycles. Also, some DPF devices can be continuously regenerated passively without adding external energy, such as Diesel fuel or electricity, into the exhaust system. During the PM loading stage, DPFs filter the exhaust gas in a manner such that PM in the exhaust is trapped inside channels formed in the DPF while gaseous components in the exhaust pass through. PM accumulation in the DPF causes an increase in the pressure drop across the DPF (DPF-$\Delta$P), which has an adverse effect on engine fuel economy. Therefore, the DPF must be regenerated before the PM loading reaches an undesirable level. Through the regeneration stage, captured PM is burned inside the DPF, thereby requiring a source of oxygen. Diesel engines normally operate in a lean combustion mode and, therefore oxygen is generally always available, at an elevated temperature, in the exhaust with or without a Diesel oxidation catalyst (DOC) positioned upstream of the DPF to provide an oxygen source in the exhaust stream. In some cases, a catalyst is used to convert NO in the Diesel exhaust to $NO_2$, and then $NO_2$ is used to react with PM (or soot) to regenerate the DPF. As PM is burned off, DPF-$\Delta$P decreases until the DPF is fully regenerated. In ideal situations, the regenerated DPF has the same DPF-$\Delta$P as it had initially, as a new filter, under the same engine operating conditions.

When the DPF is regenerated under normal vehicle operating conditions, the exothermic reaction resulting from the chemical reactions between the PM trapped in the DPF and the oxidation agents, e.g., $O_2$ and $NO_2$, will maintain the DPF internal temperature within a safe temperature range, e.g., below 700° C. More recently, DPF substrates have been constructed of lighter, thinner materials which provide more PM collection surface area per unit volume. However, the thinner materials are more prone to thermal failure. If substrate temperatures are above an upper limit, defined herein as the critical temperature, the substrate can not only warp and be damaged, but the substrate can actually melt.

DPF regeneration under normal conditions wherein the internal temperature is maintained within desirable limits is referred to as "controlled DPF regeneration" or "controlled regeneration." Under such conditions, the exhaust volumetric $O_2$ concentration is typically below 15%. However, in certain circumstances, such as if after DPF regeneration is initiated, a vehicle goes to idle by action of the driver, the exhaust $O_2$ concentration may increase to a level higher than 15%. High $O_2$ concentrations in the exhaust stream accelerates the oxidation of the trapped PM, causing the internal temperature in the DPF to increase above the critical value. When DPF regeneration produces temperatures above a safe limit, the regeneration is referred to as "uncontrolled DPF regeneration" or, more simply, as "uncontrolled regeneration," a process in which DPF temperatures may exceed a critical value, resulting in damage, or even destruction, of the DPF and, potentially, to other exhaust components positioned downstream of the DPF.

The present invention is directed to overcoming the problems associated with uncontrolled DPF regeneration. It is desirable to have a method for controlling the internal temperature of a Diesel particulate filter during regeneration to prevent an adverse temperature increase to a value above the critical temperature. It is also desirable to have a method for controlling temperature in a Diesel particulate filter during regeneration so that a desired optimum temperature can be maintained during regeneration.

SUMMARY OF THE INVENTION

In accordance with one aspect of the present invention, a method for controlling temperature in a Diesel particulate filter during regeneration includes determining the temperature of the Diesel particulate filter and the amount of particulate matter existing in the DPF. At least one engine operating parameter is sensed and a determination is made as to whether the engine is operating in an adverse condition that would be conducive to uncontrolled regeneration of the DPF. The net oxygen mass flowrate through the DPF is determined for the current engine speed and load. If it is determined that there is an impending risk of uncontrolled regeneration, the oxygen concentration in the exhaust gas is abruptly reduced and exhaust gas flowrate through the DPF is abruptly adjusted to a rate at which the net flow of oxygen passing through the DPF is within a desired concentration and mass flowrate.

Other features of the method for controlling temperature in a Diesel particulate filter during regeneration, in accordance with the present invention, include adjusting the oxygen concentration in the exhaust gas passing through the DPF to a desired value based on the current DPF temperature, the desired value being the oxygen concentration at which regeneration of the DPF filter is optimized.

BRIEF DESCRIPTION OF THE DRAWINGS

A more complete understanding of the method for controlling temperature in a Diesel particulate filter during regeneration, in accordance with the present invention, may be had by reference to the following detailed description when taken in conjunction with the accompanying drawings, wherein.

DETAILED DESCRIPTION OF THE INVENTION

Figure 1:
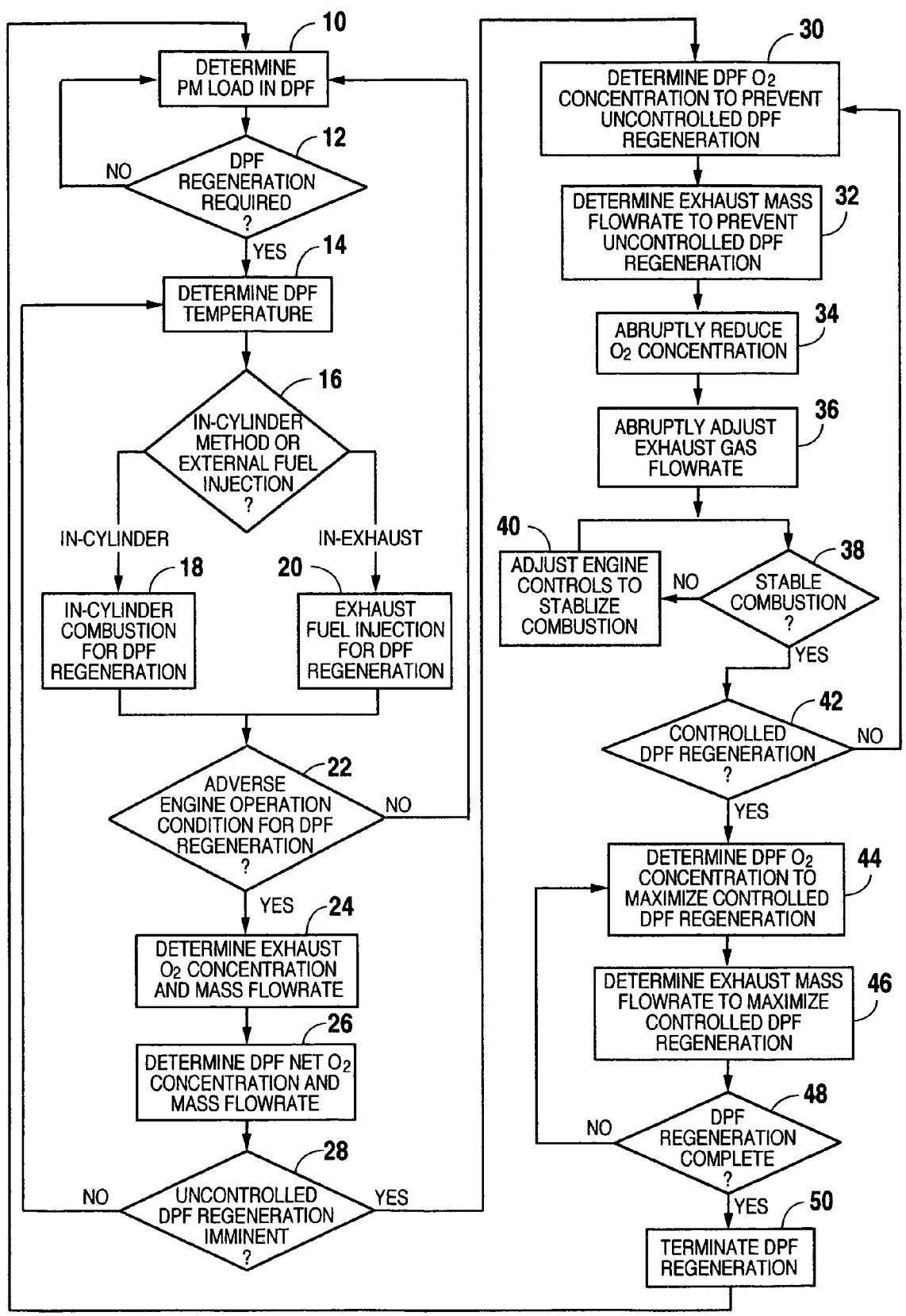
FIG. 1 is a flow chart illustrating the method for controlling temperature in a Diesel particulate filter during regeneration in accordance with the present invention.

There are three major parameters that affect the chemical reaction rates during DPF regeneration: the amount of PM loaded in the DPF, temperature, and $O_2$ and $NO_2$ concentrations in the exhaust stream. During regeneration, the particulate matter build-up inside a DPF is oxidized by a reaction with oxygen. In accordance with the present invention, after DPF regeneration is initiated, the regeneration rate is controlled by controlling $O_2$ concentration and exhaust flowrate. High $O_2$ concentrations in the exhaust stream may cause uncontrolled regeneration under low exhaust flowrate conditions.

Under normal operating conditions, DPF traps particulate matter from the exhaust. As particulate matter accumulates in the DPF, the exhaust pressure at the DPF inlet increases causing a loss in combustion efficiency. Therefore, before the loss of efficiency becomes significant, the DPF should be regenerated or cleaned.

Diesel particulate filter regeneration can be initiated during engine operation over a wide range of speed and load and in various combustion modes. For example, if DPF regeneration is initiated when the engine is operating at high load and speed conditions, the high exhaust flowrate will consequently result in high DPF inlet temperatures. Operating the engine in a low temperature combustion mode when operating at low to light load conditions produces high CO and HC species as a result of the low temperature combustion. The CO and HC promote exothermic reactions in oxidation catalysts and DPFs, thereby increasing substrate temperatures. Operating at higher speeds and loads, premixed controlled compression ignition lean combustion, or in-cylinder post or in-exhaust fuel injection by which high HC and CO species are produced promotes increased exothermic reactions in the oxidation catalyst and DPF, thereby also increasing substrate temperature.

When the DPF substrate temperature is above the minimum particulate matter oxidation temperature, but less than that of a high critical temperature, the oxidation reaction continues inside the DPF. When the DPF inlet exhaust gas temperature is reduced, the DPF substrate temperature will also be reduced due to the exothermic reaction resulting from particulate matter oxidation being less than the heat loss, mainly by convection, to the exhaust gas. When the DPF substrate temperature is above a defined minimum operating temperature, even though the DPF inlet exhaust gas temperature may be very low DPF regeneration, i.e., particulate matter oxidation in the presence of oxygen, an exothermic reaction, will continue. Under ideal conditions, the exhaust flowrate is large enough so that most of the heat generated by the exothermic reaction in the DPF will be transferred to the exhaust gas. However, when the inlet exhaust gas flowrate is not sufficient to compensate for the heat generated by the exothermic reaction, the temperature of the DPF will continue to increase. As illustrated below in FIG. 2, when heat transfer by the exhaust gas is reduced abruptly, such as by transitioning from a very high speed-load condition to idle, the temperature of the DPF will increase above a critical value in a very short period of time. This condition is defined as uncontrolled regeneration and may cause the DPF to fail as a result of thermal stress imposed on the filter.

Figure 2:
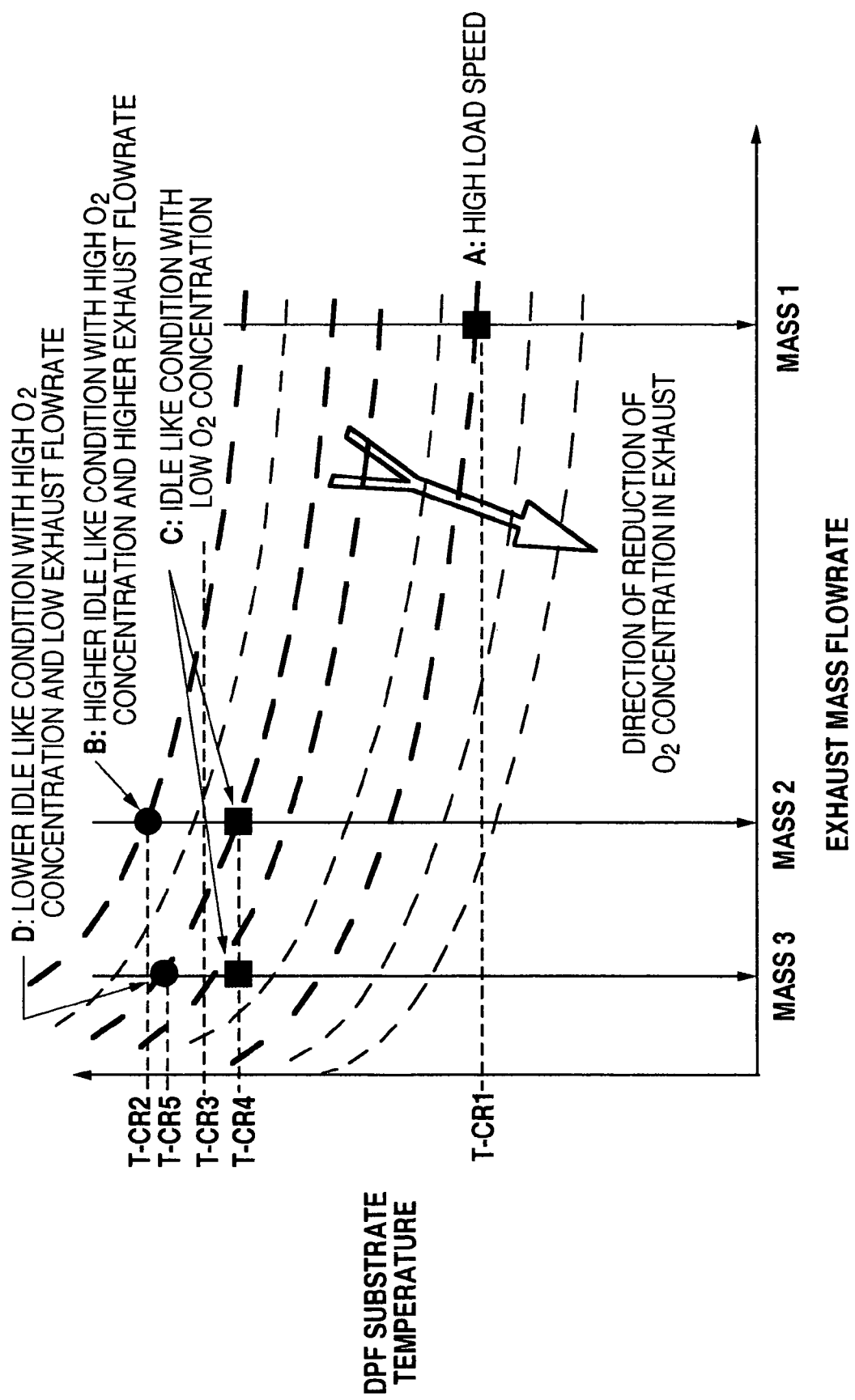
FIG. 2 is a graph of particulate filter substrate temperature at specific exhaust gas flowrates.

The relationship between exhaust mass flowrate and Diesel particulate filter substrate temperature is illustrated in FIG. 2, wherein it can be seen that the substrate temperature decreases as the exhaust mass flowrate increases. Point A on the graph represents the relationship between DPF temperature and exhaust mass flowrate when a typical Diesel engine is operating at relative high load and speed. This operating condition produces a relatively high exhaust mass flowrate, identified as Mass1 on the graph, and a relatively low DPF temperature, T-CR1. If the engine should suddenly go from high speed and load operation to high idle, the exhaust mass flowrate will sharply decrease Mass2. However, a high oxygen concentration in exhaust will enable the exothermic reaction produced by oxidation of the PM accumulated in the DPF will continue, and the substrate temperatures will rapidly increase to a value indicated by T-CR2, represented by point B, a temperature well above the critical temperature T-CR3, the temperature limit that, if exceeded, will result in damage to the DPF. Therefore, in order to prevent destruction of the DPF, the T-CR2 temperature must be quickly reduced to a temperature at least somewhat less than T-CR3, as indicated by points C, the T-CR4. When operating at lower idle, the exhaust mass flowrate is very low and the substrate temperature can be higher than T-CR3, i.e., to T-CR5 with the same oxygen concentration. The oxygen concentration in the exhaust needs to be further reduced to reduce the DPF temperature below T-CR3. The arrow in FIG. 2 indicates the direction in which the oxygen concentration in the exhaust can be reduced. The present invention, as discussed below in greater detail, provides a method by which DPF temperature during regeneration can be controlled to prevent damage to DPFs and similar catalytic exhaust treatment devices.

Figure 3:
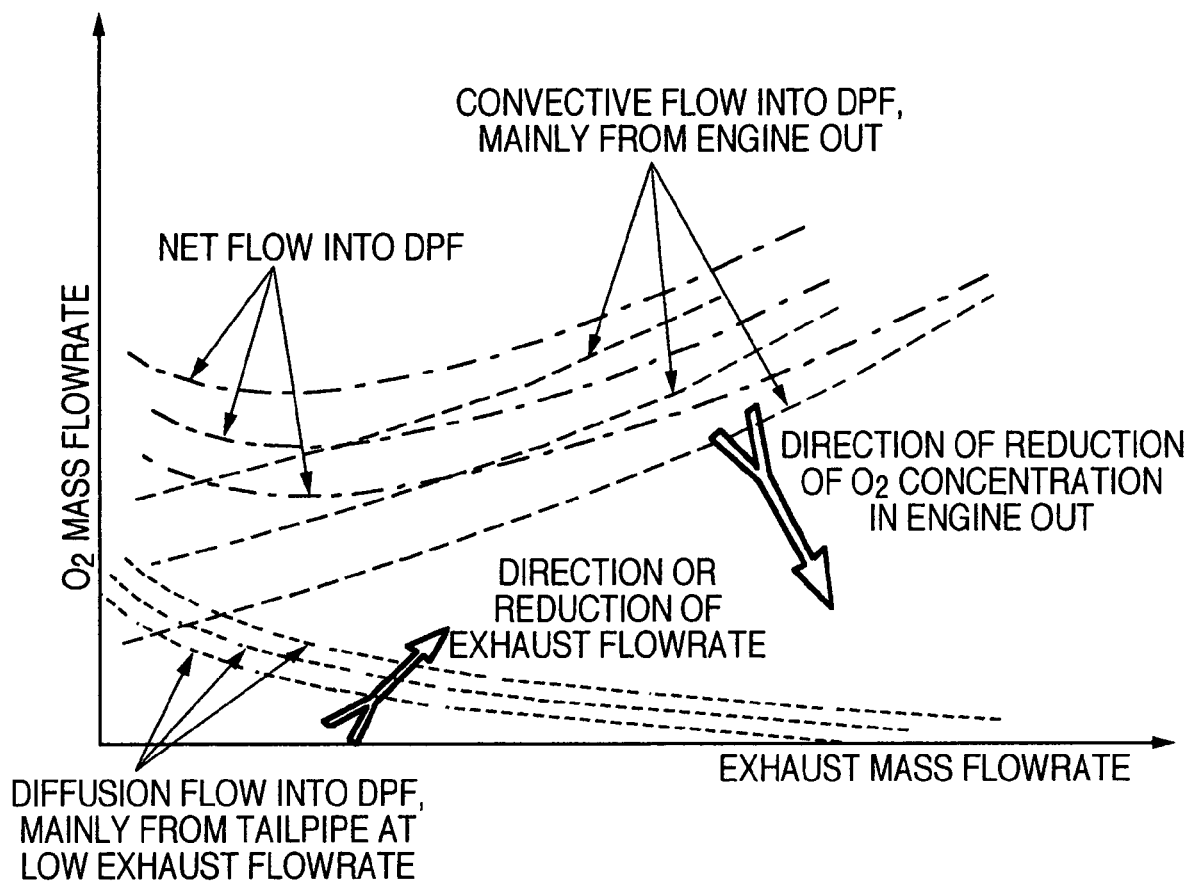
FIG. 3 is a graphical representation of the relationship between the oxygen mass flowrate and exhaust mass flowrate.

FIG. 3 illustrates the relationship between diffusion oxygen flow, convective oxygen flow, and net oxygen flow into a DPF. Convective flow is defined as the oxygen flow provided by the exhaust gas discharged from the engine, i.e., engine out. As indicated by the arrow on the right in FIG. 3, oxygen flow in the engine out exhaust reduces when the oxygen concentration in the exhaust decreases. Diffusion flow is defined as the oxygen flow from a tailpipe, generally downstream of the DPF outlet, back into the DPF when the oxygen concentration in the DPF is less than the oxygen concentration in the tailpipe. Diffusion flow is reduced as oxygen mass flowrate increases. The net oxygen mass flowrate available for promoting the exothermic reaction during regeneration is the sum of both diffusion and convective oxygen flow into the DPF.

The method of practicing the present invention as described above is illustrated in the flow diagram shown in FIG. 1. The method for controlling temperature in a Diesel particulate filter (DPF) during regeneration, in accordance with the present invention, begins at block 10, with determining the particulate material (PM) load in the Diesel particulate filter. The amount of PM retained, or held, within the DPF may be determined by sensing the differential pressure between the inlet and the outlet of the DPF, or by prediction methods modeled on the particulate matter generation history and the DPF regeneration history for a particular engine and DPF.

If it is determined that regeneration is required, as indicated at inquiry block 12, the DPF internal temperature is determined as indicated at block 14. For the purpose of carrying out this invention, the DPF temperature may be determined by direct temperature measurement of the DPF substrate, by sensing the DPF outlet temperature, or by prediction methodology based on a model of selected engine operating parameters, such as speed, fuel injection amount and timing, exhaust gas recirculation rate, and compressed, or boost, air.

A determination is then made, as indicated at block 16, whether in-cylinder or external fuel injection, as represented by blocks 18 and 20, is the best method to use in the ensuing DPF regeneration. In-cylinder combustion control for DPF regeneration generally includes control of injection timing, boost air, exhaust gas recirculation rate, intake throttling and similar techniques. External fuel injection typically uses auxiliary fuel injection into the exhaust upstream of the DPF.

As indicated at block 22, if no adverse engine operating condition is detected, the DPF regeneration routine returns to the initial starting block 10 and the steps represented by blocks 12 to 22 are repeated. If it is determined that an adverse engine operating condition such as a sudden change from high speed load to idle is present, the current oxygen concentration and oxygen mass flowrate are determined, as indicated at blocks 24 and 26 and discussed above with reference to FIG. 2.

If an adverse engine operating condition exists, as indicated at block 22, the current exhaust oxygen concentration and mass flow rate are determined as indicated at Block 24. From that measurement or determination, the net oxygen concentration in and the mass flow rate of exhaust gas through the DPF, represented by block 26 and illustrated and described above with reference to FIG. 3, are then determined for the current engine operating condition. If the net oxygen flow rate and exhaust mass flow rate are such that uncontrolled DPF regeneration is either present or imminent, as indicated at inquiry Block 28, the desired values of DPF net oxygen concentration and exhaust mass flow rate required to prevent uncontrolled DPF regeneration, is respectively determined as indicated by blocks 30 and 32. As described above prior to the specific discussion of FIG. 1, during regeneration it is desirable to maintain the substrate temperature of the DPF below a temperature at which it will be damaged. Therefore, the desired values of net oxygen concentration and mass flow rate are those values which are below the values that would support uncontrolled exothermic reactions and the resultant uncontrolled regeneration of the DPF. If uncontrolled DPF regeneration is not imminent, the DPF regeneration routine returns to block 14 where DPF temperature is detected and steps 14-28 repeated.

However, if uncontrolled regeneration of the DPF is imminent, the oxygen concentration in the exhaust gas is abruptly reduced, as indicated at block 34 from a current value to the value determined at block 30 sufficient to prevent uncontrolled DPF regeneration. As noted above, the oxygen concentration in the exhaust gas may be controlled by throttling the intake of ambient, or fresh, air, by reducing boost air, or by increasing the exhaust gas recirculation rate. The exhaust oxygen concentration is desirably reduced to a value below that at which controlled regeneration may be initiated or maintained. In addition to abruptly reducing exhaust oxygen concentration, the exhaust gas flowrate to the DPF is also abruptly adjusted, as indicated at block 36, to quickly change the exhaust mass flowrate into the DPF.

After the above adjustments to oxygen concentration and exhaust gas flow rate, a determination is made as to effect those adjustments are having on combustion stability, as represented by block 38. If combustion is not stable, the engine controls are adjusted, as indicated at block 40, to stabilize combustion. If combustion is stable, an inquiry is made, as represented by block 42, to determine if controlled DPF regeneration is, in fact, occurring. If controlled regeneration is not occurring, the control routine returns to block 30, and the DPF regeneration procedures outlined by blocks 30-40 repeated.

If the DPF regeneration is controlled, determinations as represented by blocks 44 and 46 are made of ways to control the exhaust oxygen concentration and mass flowrate to maximize DPF regeneration. The maximization process is continuously repeated until it is determined that DPF regeneration is complete, as indicated at block 48. When DPF regeneration is complete, DPF regeneration is terminated, as represented at block 50, and program control returned to the initial starting point at block 10.

There may be variations of the method illustrated in FIG. 1 without departing from the scope and intent of the invention, namely, DPF regeneration without damage to the DPF.

As can be seen from the above discussion, the oxygen concentration and exhaust control techniques by which temperature in a Diesel particulate filter during regeneration is controlled is applicable to other exhaust gas after treatment devices in which uncontrolled regeneration may damage the devices.

The present invention is described above in terms of a preferred illustrative embodiment. Other aspects, features and advantages of the present invention may be obtained from a study of this disclosure and the drawings, along with the appended claims.

We claim:

1. A method for controlling temperature in a Diesel particulate filter during regeneration, said Diesel particulate filter being disposed in an exhaust system of a Diesel engine, and said method comprising:
    determining the amount of particulate matter extant in said Diesel particulate filter;
    determining the temperature of the Diesel particulate filter in response to determining that regeneration of the Diesel particulate filter is required;
    sensing at least one engine operating parameter;
    determining if said engine is operating in an adverse condition conducive to uncontrolled regeneration of the Diesel particulate filter;
    determining the values of oxygen concentration and mass flowrate of oxygen in exhaust gas passing through the Diesel particulate filter;
    determining desired values for net oxygen concentration and mass flowrate of exhaust gas passing through said Diesel particulate filter for the sensed at least one operating parameter correlative of engine speed and load, said desired values being values below which uncontrolled regeneration of the Diesel particulate filter will occur, and said net oxygen concentration passing through the Diesel particulate filter includes the convective and diffusion flow of oxygen into the Diesel particulate filter;
    abruptly reducing the net oxygen concentration of exhaust gas passing through said Diesel particulate filter to a value less than said desired concentration in response to determining that the engine is operating in said adverse condition conducive to uncontrolled regeneration of the Diesel particulate filter; and, abruptly adjusting the exhaust mass flowrate through said Diesel particulate filter to a flowrate at which the mass flowrate of oxygen passing through the Diesel particulate filter is less than said desired mass flowrate of oxygen.

2. The method for controlling temperature in a Diesel particulate filter during regeneration, as set forth in claim 1, wherein subsequent to said abruptly adjusting the exhaust mass flowrate through the Diesel particulate filter, said method includes determining a current temperature of the Diesel particulate filter and adjusting the oxygen concentration of exhaust gas passing through the Diesel particulate filter to a value based on the determined current temperature at which the regeneration of said Diesel particulate filter is optimized.

3. The method for controlling temperature in a Diesel particulate filter during regeneration, as set forth in claim 1, wherein said determining the temperature of the Diesel particulate filter includes sensing the temperature of at least one of a substrate member of the Diesel particulate filter and an outlet temperature of the Diesel particulate filter.

4. The method for controlling temperature in a Diesel particulate filter during regeneration, as set forth in claim 1, wherein said determining the temperature of the Diesel particulate filter includes predicting the temperature of the Diesel particulate filter by reference to a preestablished model of at least one of engine speed, the amount and timing of fuel concurrently injected into the engine, exhaust gas recirculation rate, engine coolant temperature and the mass of ambient air concurrently introduced into the engine.

5. The method for controlling temperature in a Diesel particulate filter during regeneration, as set forth in claim 1, wherein said determining the amount of particulate matter extant in said Diesel particulate filter includes at least one of sensing the pressure differential of the exhaust gas flow between an inlet and an outlet of the Diesel particulate filter and predicting the amount of particulate matter based on a historical model of particulate matter generation and Diesel particulate regeneration for a current engine operating condition.

6. The method for controlling temperature in a Diesel particulate filter during regeneration, as set forth in claim 1, wherein said determining if said engine is operating in an adverse condition conducive to uncontrolled regeneration of the Diesel particulate filter includes sensing a transition from high engine speed and load operation to engine idle.

7. The method for controlling temperature in a Diesel particulate filter during regeneration, as set forth in claim 1, wherein said engine includes a means for reducing the relative amount of ambient air introduced into said engine, and said abruptly reducing the oxygen concentration of exhaust gas passing through said Diesel particulate filter includes reducing the amount of ambient air introduced into the engine.

8. The method for controlling temperature in a Diesel particulate filter during regeneration, as set forth in claim 1, wherein said engine includes a throttle by which the amount of ambient air introduced into the engine is reduced, and said abruptly reducing the oxygen concentration of exhaust gas passing through said Diesel particulate filter includes at least partially closing said throttle.

9. The method for controlling temperature in a Diesel particulate filter during regeneration, as set forth in claim 1, wherein said engine includes a turbocharger having a compressor stage by which ambient air is compressed prior to being introduced into the engine, and said abruptly reducing the oxygen concentration of exhaust gas passing through said Diesel particulate filter includes reducing the amount of compressed intake air introduced into said engine.

10. The method for controlling temperature in a Diesel particulate filter during regeneration, as set forth in claim 1, wherein said engine includes an exhaust gas recirculation system, and said abruptly reducing the oxygen concentration of exhaust gas passing through said Diesel particulate filter includes increasing the relative amount of exhaust gas recirculated to an intake manifold of the engine.

11. The method for controlling temperature in a Diesel particulate filter during regeneration, as set forth in claim 1, where said engine includes an in-cylinder fuel injection means, and said abruptly reducing the oxygen concentration of exhaust gas passing through said Diesel particulate filter includes increasing the relative amount of quantity of in-cylinder fuel injection to the engine.

12. The method for controlling temperature in a Diesel particulate filter during regeneration, as set forth in claim 1, where said engine includes an in-exhaust fuel injection means, and said abruptly reducing the oxygen concentration of exhaust gas passing through said Diesel particulate filter includes increasing the relative amount of quantity of in-exhaust fuel injection to the engine.

13. The method for controlling temperature in a Diesel particulate filter during regeneration, as set forth in claim 1, where said engine includes an engine control means, and said engine control means maintains the engine stable while abruptly reducing the oxygen concentration of exhaust gas passing through said Diesel particulate filter.

* * * * *